United States Patent
Ashour et al.

(10) Patent No.: US 9,425,546 B2
(45) Date of Patent: Aug. 23, 2016

(54) CONTACT HOUSING WITH POSITIONING MEANS FOR FIXING THE POSITION OF A CABLE THAT IS PRONE TO KINKING

(71) Applicant: TYCO ELECTRONICS AMP GmbH, Bensheim (DE)

(72) Inventors: Yehya Ashour, Darmstadt (DE); Hartmut Ripper, Darmstadt (DE)

(73) Assignee: TE Connectivity Germany GmbH, Bensheim (DE)

( * ) Notice: Subject to any disclaimer, the term of this patent is extended or adjusted under 35 U.S.C. 154(b) by 169 days.

(21) Appl. No.: 14/029,262

(22) Filed: Sep. 17, 2013

(65) Prior Publication Data

US 2014/0087582 A1 Mar. 27, 2014

(30) Foreign Application Priority Data

Sep. 24, 2012 (DE) .......................... 10 201 221 7211

(51) Int. Cl.
| | |
|---|---|
| *H01R 13/58* | (2006.01) |
| *H01R 13/56* | (2006.01) |
| *H01R 13/502* | (2006.01) |
| *G02B 6/38* | (2006.01) |
| *H01R 13/514* | (2006.01) |

(52) U.S. Cl.
CPC .......... *H01R 13/562* (2013.01); *H01R 13/502* (2013.01); *G02B 6/3829* (2013.01); *G02B 6/3887* (2013.01); *H01R 13/514* (2013.01)

(58) Field of Classification Search
CPC ............ H01R 13/5833; H01R 13/516; H01R 13/506; H01R 13/5808; H01R 13/595; H01R 13/5812; H01R 2103/00

USPC .................. 439/456, 468, 473, 470, 902
See application file for complete search history.

(56) References Cited

U.S. PATENT DOCUMENTS

| 5,570,443 A | * | 10/1996 | May et al. ...................... 385/75 |
|---|---|---|---|
| 5,890,926 A | * | 4/1999 | Pauza et al. .................. 439/445 |
| 6,231,375 B1 | * | 5/2001 | Kashiyama .................... 439/456 |
| 6,773,296 B2 | * | 8/2004 | Kihira et al. ................. 439/445 |
| 7,182,626 B2 | * | 2/2007 | Langolf ........................ 439/473 |
| 7,704,086 B2 | * | 4/2010 | Gimbel ............. H01R 13/5202 439/157 |
| 2013/0029508 A1 | * | 1/2013 | Forell et al. .................. 439/271 |

FOREIGN PATENT DOCUMENTS

DE    10 2010 013 446 A1    10/2011

* cited by examiner

*Primary Examiner* — Hien Vu
(74) *Attorney, Agent, or Firm* — Barley Snyder

(57) ABSTRACT

A contact housing for a connector of a connector assembly extends through a wall and includes a contact region having a contact seat for receiving a contact-side end of a kink-prone cable. The connector may be for a sealed connector assembly that includes an outer housing, which has a cable inlet opening and an interior space, at least sections of which form a mating-connector receptacle for a mating connector that is complementary to the connector. At least sections of the contact housing of the connector are arranged in the interior space. The contact housing, which has the contact region having the contact seat for holding the contact-side end of the kink-prone cable, facilitates assembly of the connector and prevents damage to the kink-prone cable, and includes positioning means for fixing the position of a laced section of the kink-prone cable.

26 Claims, 10 Drawing Sheets

CONTACT HOUSING WITH POSITIONING MEANS FOR FIXING THE POSITION OF A CABLE THAT IS PRONE TO KINKING

FIELD OF THE INVENTION

The present invention relates to a contact housing for a connector of a sealed connector assembly that extends through a wall, having a contact region which has a contact seat for receiving a contact-side end of a cable that is prone to kinking.

The present invention further relates to a connector for a sealed electrical connector assembly that extends through a wall, said connector comprising an outer housing, which has a cable inlet opening and an interior space, at least sections of which form a mating connector receptacle for a mating connector that complements the connector, and comprising a contact housing, at least sections of which are arranged in the interior space, said housing having a contact region with a contact seat, and comprising a cable that is prone to kinking, the contact-side end of which is held in the cable seat.

RELATED ART

Connectors of the aforementioned type and contact housings for such connectors are known in the art. They are used, for example, in automobiles for connector assemblies that extend through holes in body panels. The connectors contain cables that are prone to kinking, for example, high-speed data cables, which frequently comprise optical waveguides.

A generic connector assembly and a generic contact housing are known, for example, from patent application DE 10 2010 013 446 A1, of the same applicant. In this connector, all the cables extend nearly barrier-free from the contact region of the contact housing up to the cable inlet opening in the outer housing.

It is a disadvantage of this configuration that when cables that are prone to kinking, for example, high-speed data cables, are used, undesirable cable breaks can occur when the contact housing is positioned in the outer housing and the cable or cables that are prone to kinking are in an unfavorable position in which they are bent or are exposed to other undesirable stresses. Furthermore, it cannot be ruled out that the cables of the connector might be routed in areas where installation is made more difficult and proper assembly of the connector is impeded.

BRIEF DESCRIPTION OF EMBODIMENTS OF THE INVENTION

The problem addressed by the present invention is therefore that of providing a contact housing for a connector that will facilitate assembly of the connector and will prevent damage to a cable that is prone to kinking. The present invention further addresses the problem of providing a connector that has a cable that is prone to kinking, which connector can be easily and reliably installed without risk of damage to the kink-prone cable.

The contact housing described in the introductory part solves this problem according to the invention in that the contact housing comprises a positioning means for fixing the position of a laced section of the cable that is prone to kinking.

The connector described in the introductory part solves the problem by means of a contact housing embodied according to the invention, wherein the laced section of the cable that is prone to kinking is fixed in position by the positioning means.

The contact housing according to the invention and the connector according to the invention having a contact housing of said type offer the advantage that cable that is prone to kinking can be arranged on the contact housing and can be aligned in a specific position. This prevents the kink-prone cable from assuming an unintended and disadvantageous position during assembly of the contact housing and the outer housing, in which position the cable would impede installation or, even more seriously, in which the cable would be bent too far or would be otherwise stressed and thereby damaged. This is prevented by the contact housing according to the invention, because the positioning means fixes the laced section of the kink-prone cable in a predefined position, thereby protecting it from damage. Installation of the connector is also facilitated since the cable that is prone to kinking is fixed in the contact seat at more than just its contact-side end.

The solution according to the invention can be supplemented and further improved by the following embodiments, each of which is individually advantageous, and which can be combined with one another as desired. The features of the individual embodiments, the advantages of which will be specified in greater detail in what follows, can be combined with one another as desired or can be omitted.

For instance, according to a first embodiment of the contact housing according to the invention, the positioning means can have a guide element for aligning the cable that is prone to kinking, and a fastening element for securing the kink-prone cable onto the housing body.

The fastening element can be, for example, a fastening clamp, a fastening spring, a fastening clip or a fastening screw, which is used to secure the laced section of the cable that is prone to kinking onto the housing body. The fastening element can be a detachable, reusable fastening element, which enables not only the fastening of the cable that is prone to kinking onto the contact housing, but also the detachment of the installed cable from the housing, which is advantageous for the maintenance and repair of the connector according to the invention and/or the contact housing thereof.

The guide element allows the laced section of the cable that is prone to kinking to be routed in a defined direction. In this manner, the guide element can align the laced section of the kink-prone cable toward the cable inlet opening of the connector. This is advantageous in that the kink-prone cable is secured by the positioning element on the contact housing in a position in which it can be routed from the positioning means, nearly without stress, through the cable inlet opening in the outer housing and out of the connector. The guide element can be embodied, for example, as a guide channel, in which the laced section of the cable that is prone to kinking can be inserted and supported. The dimensions of the guide channel, such as channel width and channel depth, can be adapted to the outer dimensions of the kink-prone cable such that the cable can be easily inserted into the guide channel, while at the same time being routed in a stable position in the radial cable routing direction. Insertion of the cable into the guide element can be facilitated, for example, by the fact that the guide element has a funnel-shaped intake area, which leads into the actual guide area in which the laced section comes to rest. The kink-prone cable can also be properly positioned in the guide element due to the fact that the shape of the guide element, for example, the crosssection of a guide channel, is adapted to the outer contours of the laced section of the kink-prone cable to be held in said guide channel.

According to a further embodiment, the fastening element can be arranged on the guide element such that the position alignment and the securing of the cable that is prone to kinking coincide, thereby enabling a particularly compact embodiment. For example, retaining elements could be formed on a guide channel, which elements would decrease the dimensions at the channel inlet enough that the width thereof at the location of the retaining element is narrower than the outer diameter of the laced section of the kink-prone cable. The retaining element therefore prevents the cable from becoming unintentionally detached from the guide channel. However, it is not necessary for the cable to be immovably connected to the contact housing. Displacement of the cable along its longitudinal axis can be possible and entirely desirable.

According to a further embodiment, at least sections of the guide element can be arranged between the contact seat and the fastening element. The cable that is prone to kinking is thereby aligned in its position between the two fastening points on the contact housing, namely the contact seat on one side and the fastening element on the other side, by the guide element, and is situated in a predefined position.

An unguided region of the cable that is prone to kinking can extend from the contact-side end, which is located in the contact seat, up to the laced section, which is fixed in position in the positioning means. The unguided region of the cable that is prone to kinking can take on its natural bending angle, which is therefore the angle of least stress, in the region between contact seat and positioning means. The position alignment of the guide element can thus predefine the bending of the kink-prone cable in this unguided region. As a result, the cable that is prone to kinking is prevented from bending beyond a maximum bending radius and/or a maximum bending angle, which, if exceeded, will result in damage to the cable. The bending radius and/or the bending angle in the unguided region can be achieved in a simple manner by establishing a predefined distance between contact seat and positioning means and by the spatial alignment of the contact seat toward the location of the positioning means.

In a further embodiment, the contact region can further comprise a contact module receptacle for accommodating at least one contact module, which is designed to be fitted with at least one final cable. A contact module receptacle of this type for accommodating a contact module is known in the prior art. Door connectors, such as are used, for example, in the automobile industry, have a plurality of contact modules that can be fitted with stranded cables. Fitting these modules with a plurality of stranded cables is problematic in that, with the contact housings that are known in the prior art, for example, from DE 10 2010 013446 A1, some of these unguided stranded cables may be in positions in which they make assembly of the contact housing with the outer housing and/or joining of the connector with its mating connector difficult or even impossible. The contact housing according to the invention can have a retaining device which restricts the exit of the stranded cable from the contact housing to a predefined contact outlet region. With the connector according to the invention, the cable outlet region of the contact housing can lead to the region of the cable inlet opening in the outer housing, as a result of which the stranded cables of the contact module exit the contact housing in the immediate vicinity of and directed toward the cable inlet opening of the outer housing. The assembly of the connector and the closing of a connector assembly that extends through a wall are facilitated in that the cables are able to exit the contact housing only at predefined locations.

The retaining device can form a barrier, for example, which blocks the path of the stranded cables and thereby holds them inside the contact housing until they reach the cables from the cable outlet regions. One particularly simple embodiment of the retaining device can comprise a stripper, for example, which bridges two opposite side walls of the contact housing, between which the contact module with the stranded cables is positioned. When the contact modules are placed in the contact module receptacle of the contact housing, at least some of the stranded cables slide along the stripper and are held by said stripper in the contact housing.

According to a further embodiment, the retaining device can be embodied as a cover, which seals at least sections of the contact housing opposite the connecting direction in which the contact housing of the assembled connector is inserted into a mating connector. In generic connectors, the contact modules are frequently inserted into the contact housing perpendicular to the connecting direction, wherein the stranded cables, which are secured in the one or more contact modules, are routed out of the contact module opposite the connecting direction. With a cover, the stranded cables, in particular, the stranded cables which are pushed the farthest into the contact housing during insertion, and which are therefore located the greatest distance from the cable inlet opening in the assembled connector and are therefore at the greatest risk of undesirable positioning in the connector, can be held in the contact housing. The cover can therefore particularly cover the stranded cables that are the farthest removed from the inlet opening in the assembled connector, and can retain these up to the cable outlet region of the contact housing.

According to a further embodiment, the fastening element and/or the guide element can be arranged on the retaining device. The number of components of the contact housing is thereby reduced because the retaining device performs a double function, specifically, fixing the kink-prone cable in position and restricting the stranded cables to the cable outlet region.

In one compact and easily producible embodiment of the contact housing, the positioning means can be integrated into the cover. For example, in the side of the cover that faces outward, away from the contact module receptacle, a guide channel with retaining elements can be formed. The cover of the cable duct can thereby hold the stranded cables down, while at the same time comprising the positioning means for the cable that is prone to kinking.

The contact housing can be formed as an integral piece with the positioning means and/or the retaining device. An integral embodiment of the contact housing of this type, in which positioning means and retaining device are integrated into the contact housing itself, reduces the number of components and therefore the assembly steps that are necessary for assembling the connector according to the invention. An integral contact housing with positioning means and retaining device can be produced easily and in large numbers as an injection molded part.

According to a further embodiment, the contact housing can have a cable duct, which leads from the contact module receptacle to the cable outlet region, and therefore restricts the emergence of the stranded cables from the contact housing to the cable outlet region. In this case, the retaining device, for example, the cover, can be part of the cable duct.

In a further embodiment, the cable seat can be arranged outside of the cable duct. For example, the cable seat can be directly adjacent to the cable duct, resulting in a particularly compact design of the contact housing.

BRIEF DESCRIPTION OF THE DRAWINGS

In what follows, the present invention will be specified in greater detail by way of example, within the context of embodiments, with reference to the attached set of drawings. The embodiments represent merely possible configurations, in which individual features, as described above, can be implemented independently of one another or can be omitted. In the interest of clarity, in the description of the embodiments, the same features and elements have been identified by the same reference signs.

The drawings show.

DETAILED DESCRIPTION OF EMBODIMENTS OF THE INVENTION

First, a connector assembly 1 comprising a connector 2 according to the invention and a mating connector that is complementary to the connector 2 will be described, with reference to FIGS. 1 and 2. The connector 2 and the mating connector 3 are arranged opposite one another at a hole 4 in a wall 5, wherein the connector 2 is located on a first side 6 of the wall 5 and the mating connector 3 is located on the other, second side 7 of the wall 5. The wall 5 can be a body panel of an automobile, for example.

Figure 1:
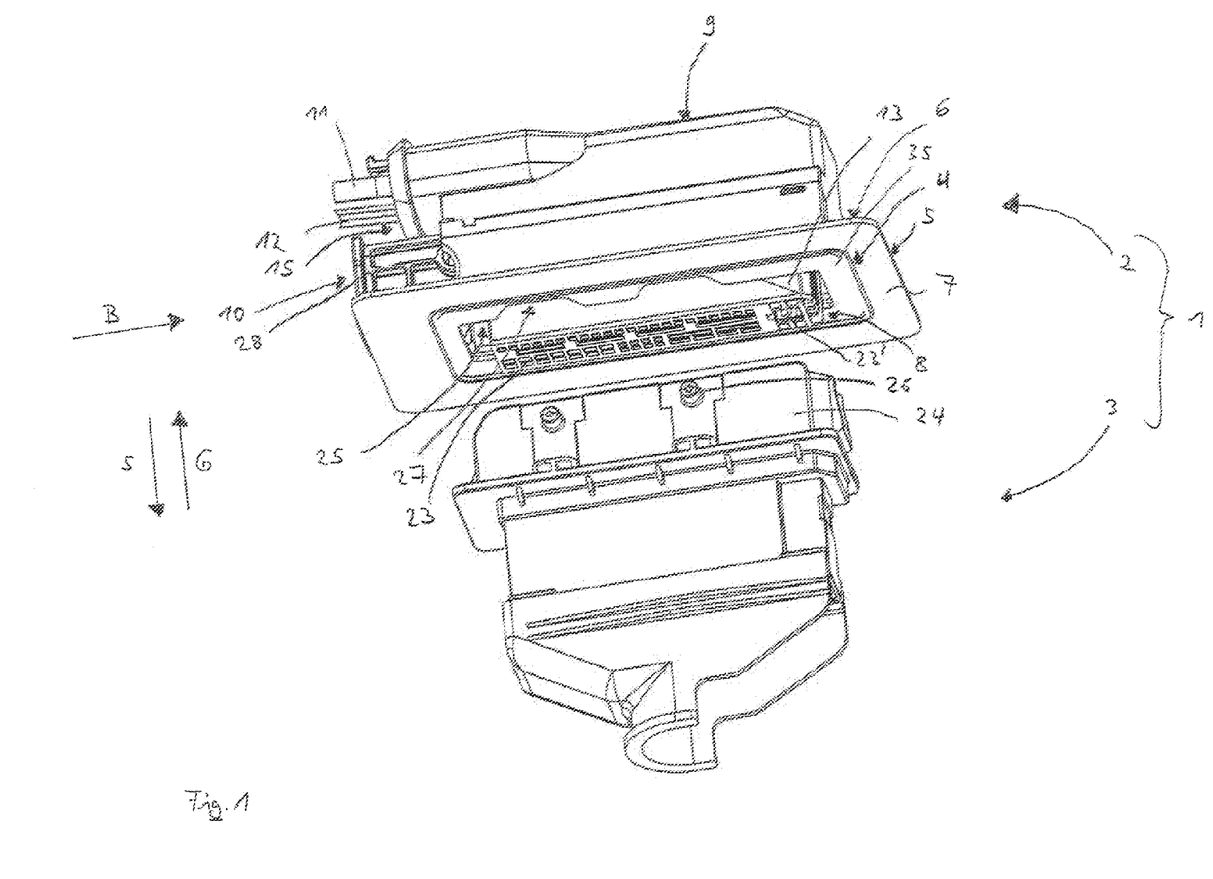
FIG. 1 a schematic perspective view of a connector according to the invention and of a complementary mating connector, which form a sealed connector assembly that extends through a wall, in a pre-connected state prior to closing of the connector assembly.
Figure 2:
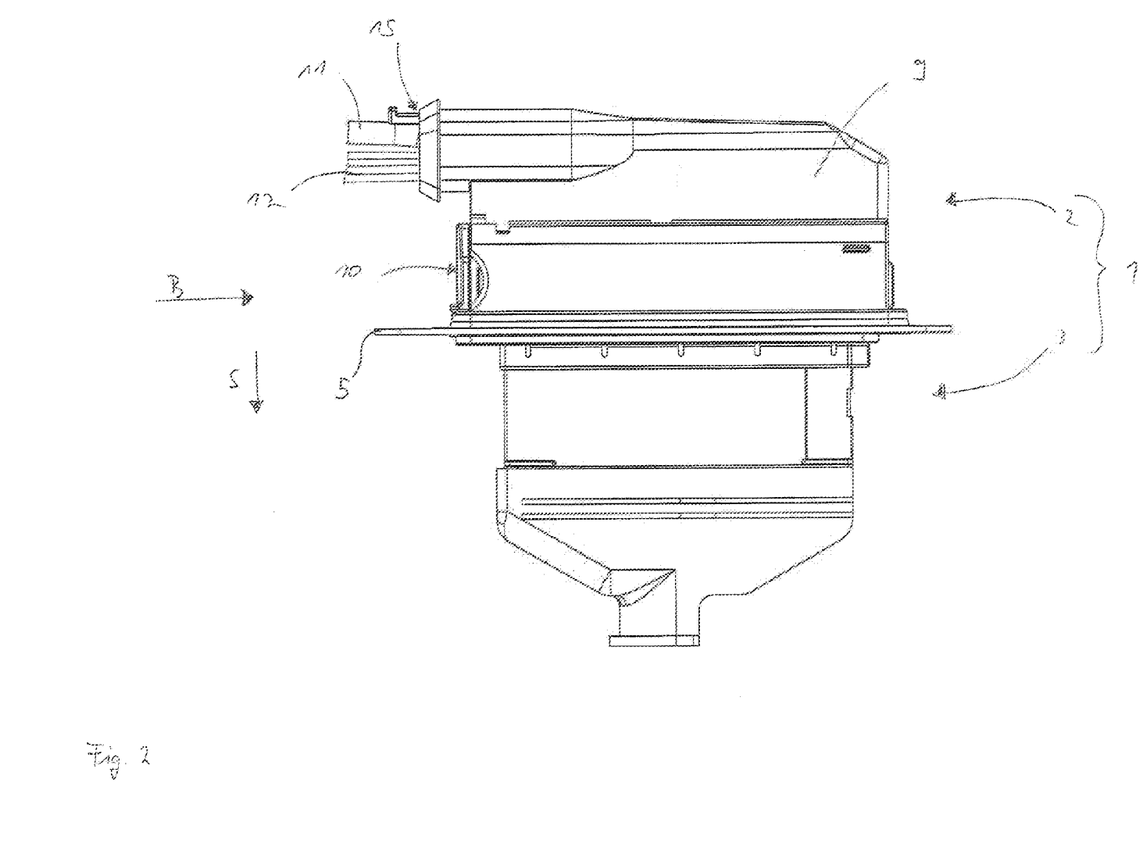
FIG. 2 a schematic side view of the connector assembly of FIG. 1 in the assembled state.

In the illustration shown in FIG. 1, the connector 2 and the mating connector 3 are in a preconnected position, in which they are ready to be joined through the hole 4 in a connecting direction S of the connector 2 and/or in a mating connector direction G of the mating connector 3, in order to close the connector assembly 1. For this purpose, the connector 2 is equipped with a connecting section 8, which protrudes in connecting direction S in the connector 2.

The connector 2 is further equipped with an outer housing 9, a locking device 10, a cable that is prone to kinking 11, various stranded cables 12, and the contact housing 13 according to the invention, the contact region 14 of which comprises the connecting section 8 of the connector 2. To assemble the connector 2, the cable that is prone to kinking 11 and the stranded cables 12 are inserted through a cable inlet opening 15 into the outer housing 9 of the connector 2. The contact-side end 16 of the kink-prone cable 11, on which a contact element 17 (not shown here) is arranged, is then positioned in a contact seat 18 provided for this purpose, which is formed in the contact region 14 of the contact housing 13. In a similar manner, the stranded cables 12 are inserted into the interior space 19 of the outer housing 9, where they occupy with their stranded contacts 20 the various contact cavities 21 of the contact modules 22, 22'.

The connecting section 8 contains a plurality of contact openings 23, 23' for insertion of electrical mating contact elements (not shown) that are housed in the mating connector 3. In the embodiment shown, the connector 2 according to the invention is configured as a female connector, so that in the embodiment shown by way of example, the mating contact elements of the mating connector 3 would be pin contacts (not shown). The contact openings 23, 23' face in the connecting direction S and represent openings through which the mating contact elements can be inserted in the mating connector direction G into the contact cavities 21 of the contact modules 22, 22' and/or into the contact seat 18.

The mating connector 3 comprises a mating-connector contact housing 24, in which the mating-connector contacts thereof (not shown) are arranged, and which is placed in a mating connector receptacle 25 provided for this purpose in the interior 19 of the connector 2 during joining of connector 2 and mating connector 3. To secure connector 2 and mating connector 3 of the connector assembly 1 in the assembled state, which is shown in FIG. 2, the mating connector 3 is equipped with fastening pins 26. During assembly, the fastening pins 26 are guided through fastening element openings 27 provided for this purpose in the wall 5 and in the outer housing of the connector (not visible) and come to rest in mating connector receptacle 25.

Figure 3:
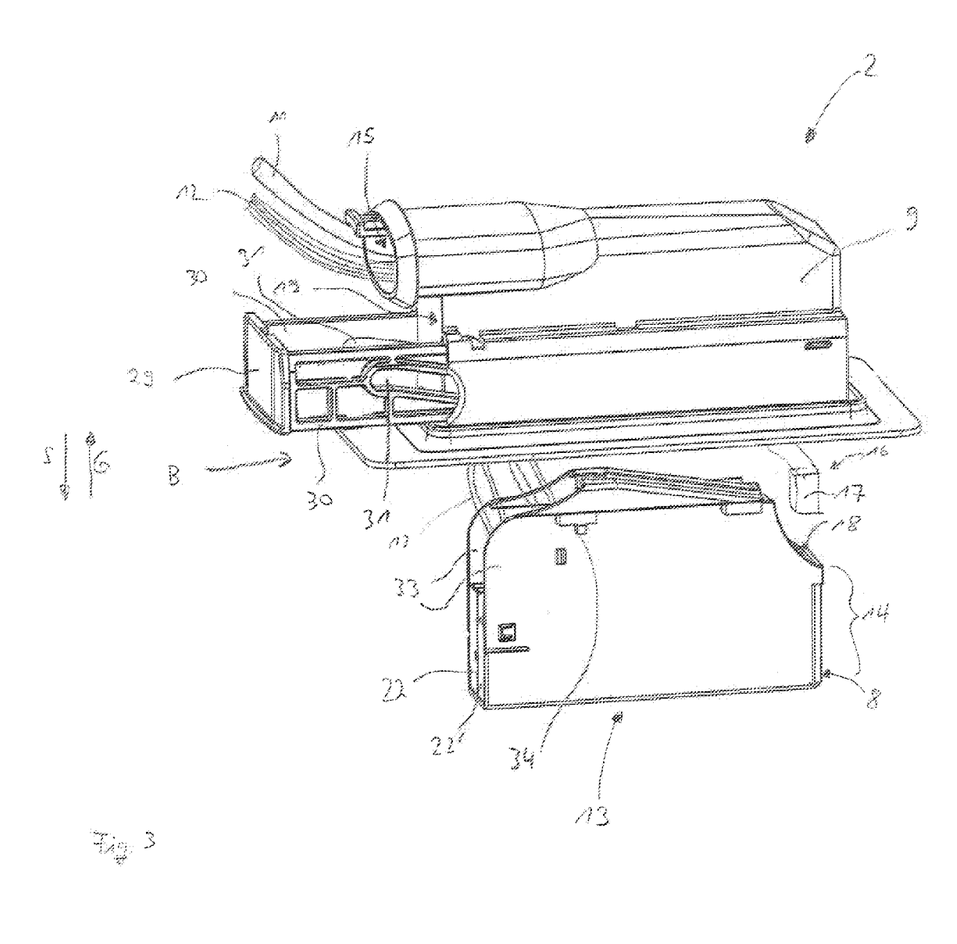
FIG. 3 a schematic perspective view of a connector according to the invention in an assembled state, before the contact housing according to the invention is arranged in the interior space of the housing.

To undetachably secure connector 2 and mating connector 3 to one another in the connected position, the connector 2 has a locking device 10, which in the embodiment shown is embodied as a sliding element 28. The sliding element 28 can be shifted from its unlocked position, which is shown in FIGS. 1 and 3, to its locked position, which is shown in FIG. 2, along a direction of actuation B, which extends perpendicular to connecting direction S. The sliding element 28 comprises an actuation section 29, which faces opposite the direction of actuation B, and two crossbar-like locking elements 30 with locking elements 31 in the form of a sliding track-type guide. The fastening pins 26 of the mating connector are inserted into these tracks during the assembly of connector 2 and mating connector 3. When the locking device 10 is shifted from the unlocked position to the locked position, the fastening pins 26 slide along the sliding track-type locking elements 31. The sliding track-type guide extends at an angle in relation to connecting direction S. With this, the mating connector 3 is drawn completely into the connector 2 in the mating connecting direction G and is locked in place there, as illustrated in FIG. 2.

In what follows, the assembly of the connector 2 according to the invention will be described in greater detail, in particular, with reference to FIG. 3. For the installation of the connector 2 according to the invention, first the cable that is prone to kinking 11 and all the stranded cables 12 are inserted through the inlet opening 15 in the outer housing 9, led by their corresponding contact elements 17 and/or stranded contacts 20. Since the cable inlet opening 15 opens up essentially opposite the actuation direction B, the cables 11 and 12 are threaded, with their contact elements 17, 20 first, in direction of actuation B through the inlet opening 15 in the outer housing 9 until they emerge from the contact opening (not shown) that faces connecting direction S. The interior space 19 in the outer housing 9 can be accessed through the contact opening, and the contact housing according to the invention is later inserted through this opening into the outer housing. In FIG. 3, the threaded-in arrangement of the kink-prone cable 11 is shown by way of example with its contact-side end 16 and with the contact element 17 prior to their positioning in the contact seat 18.

The contact element 17 of the kink-prone cable 11 is then inserted into the contact seat 18 in the contact housing 13. Similarly, the stranded contacts 20 of the individual stranded cables 12 are positioned and locked in place in the contact cavities 21 provided for this purpose in the corresponding contact modules 22, 22', before the contact modules 22, 22' are received in direction of actuation B in a contact module receptacle 32, provided for this purpose in the contact region 14, which will be discussed in greater detail in what follows. Finally, the contact housing 13 is inserted, at least partially, in mating connector direction G through the contact opening into the interior space 19 of the outer housing 9 and is positioned there, thereby completing assembly of the connector 2 according to the invention. The contact housing 13 is preferably secured in the outer housing 9, for which purpose latching elements 34 are provided on the outer sides of its side walls 33, which elements can be latched with complementary counter-latching elements in the interior space 19 of the outer housing 9 (not shown).

Figure 4:
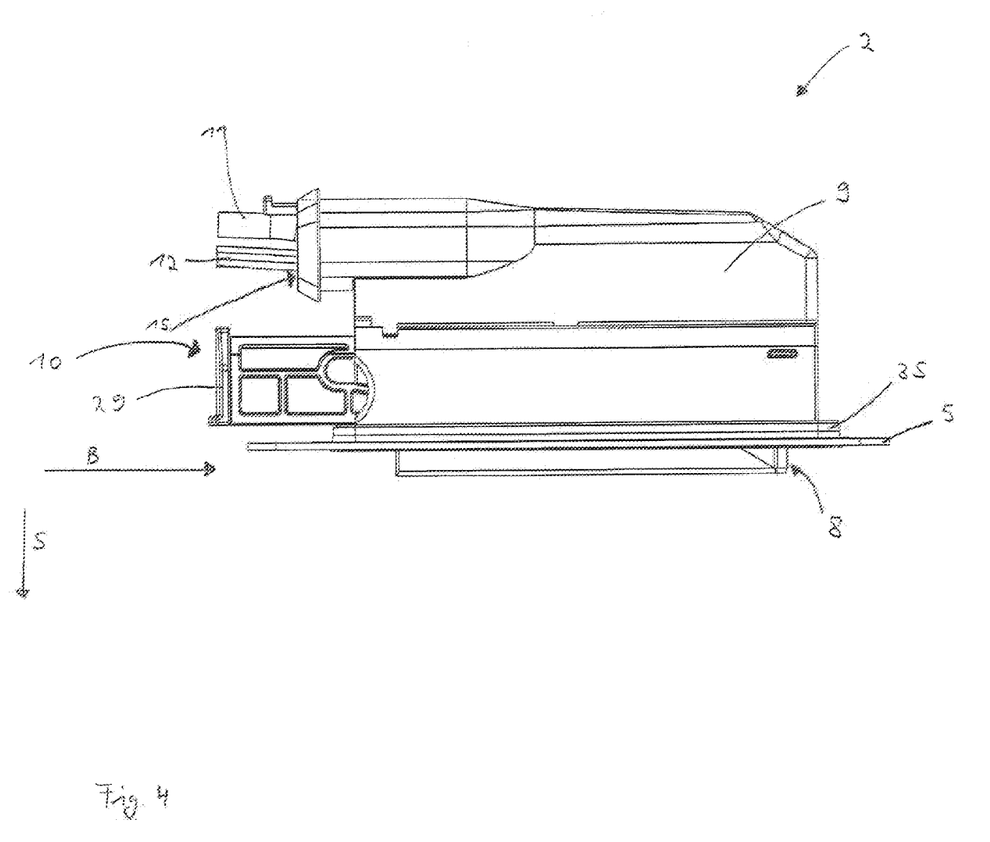
FIG. 4 a side view of the connector of FIG. 3 according to the invention, in the assembled state.
Figure 5:
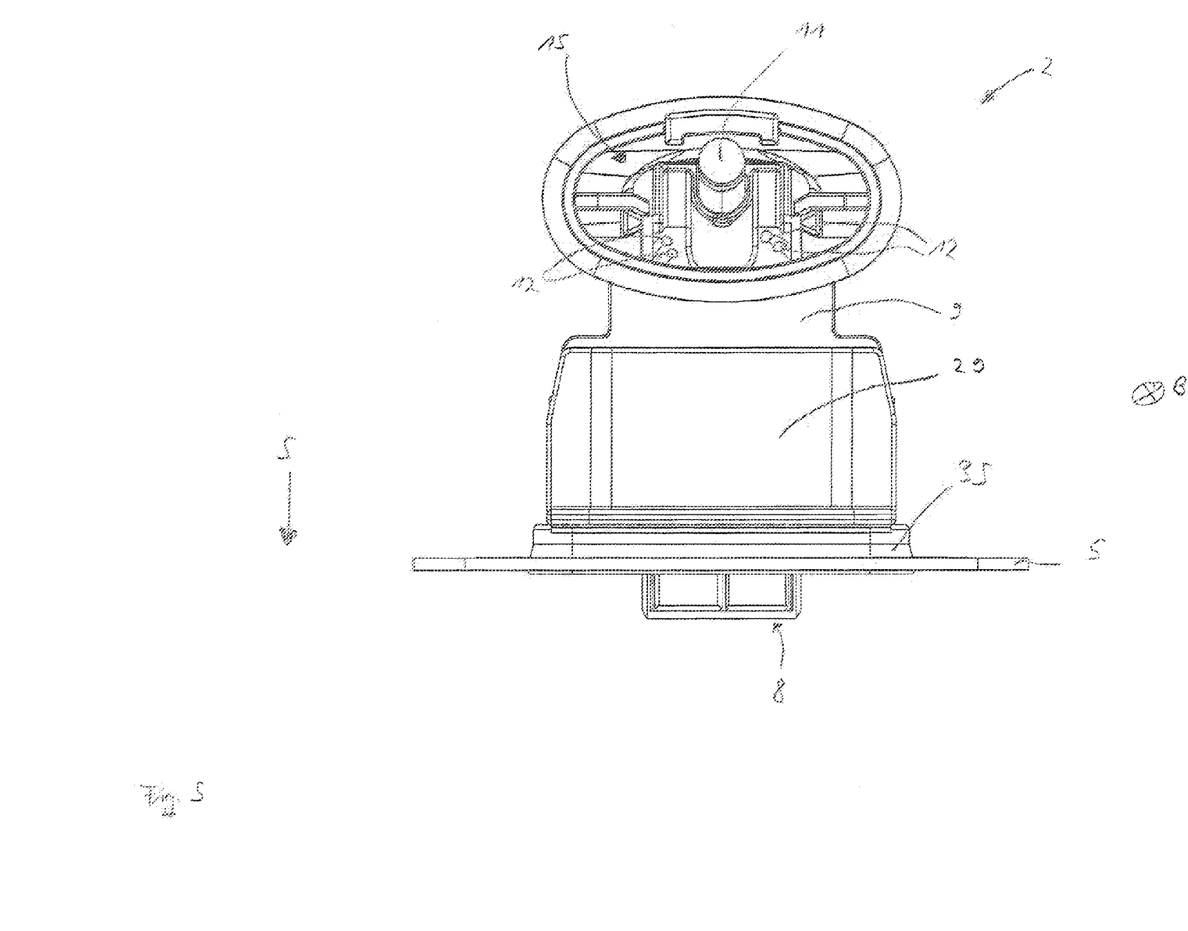
FIG. 5 a side view of the connector of FIG. 4 according to the invention, viewed in the direction of actuation toward the cable inlet opening.

The assembled state of the connector 2 according to the invention is shown from a side view in FIG. 4 and from a frontal view in direction of actuation B in FIG. 5. FIGS. 4 and 5 show, by way of example, illustrations in which the connector 2 is already arranged on the wall 5. To seal the connector 2 in relation to the wall 5, said connector comprises a circumferential seal 35, which seals the interior space 19 of the outer housing 9 from the surrounding area.

In what follows, the contact housing 13 according to the invention and the fitting of this contact housing 13 with cable that is prone to kinking 11 and the contact modules 22, 22' with stranded cables 12 will be specified in greater detail in reference to FIGS. 6 to 9.

Figure 6:
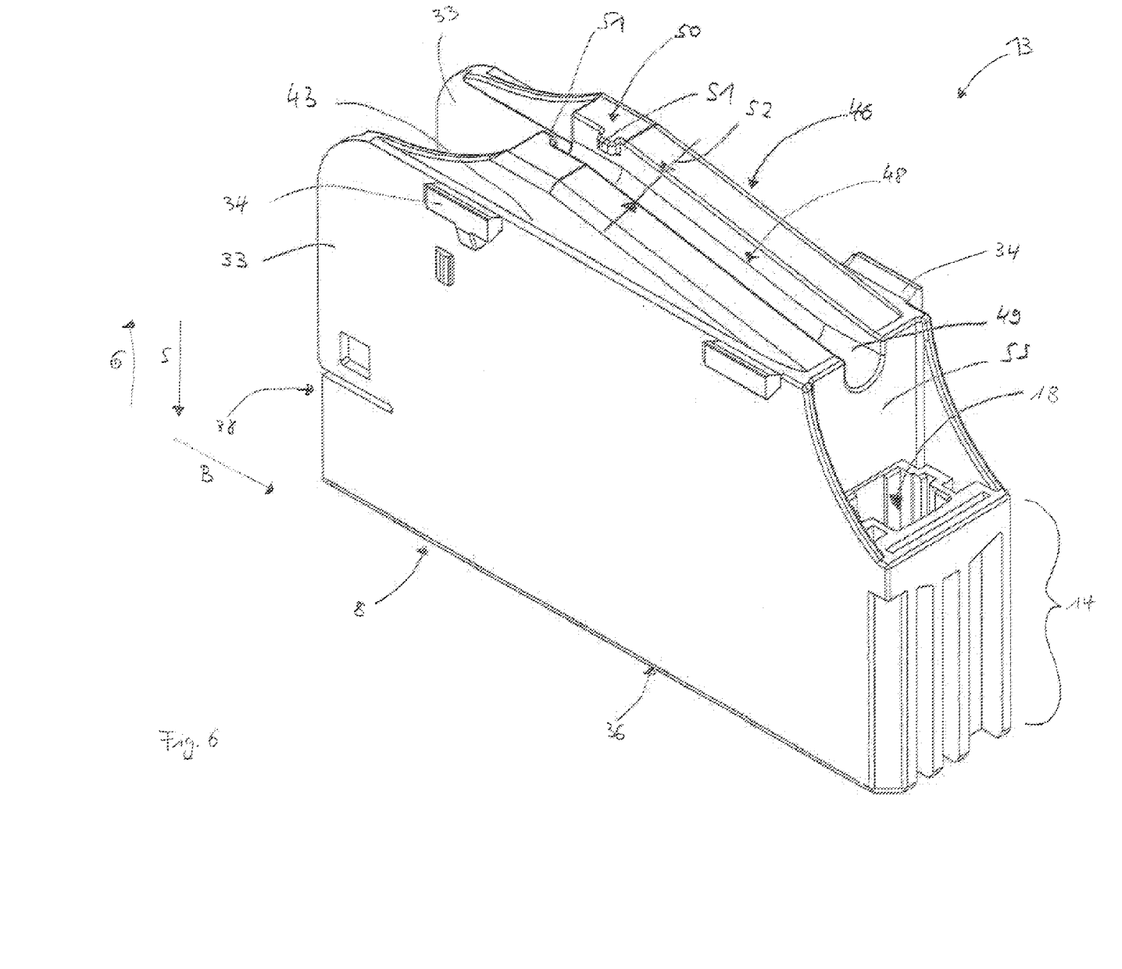
FIG. 6 a schematic, perspective view of the contact housing according to the invention.

The contact housing 13 according to the invention comprises a contact region 14, the section of which that faces connecting direction S forming the connecting section 8 of the connector 2.

The contact region has the contact seat 18 at its end that faces direction of actuation B. The contact-side end 16 of the cable that is prone to kinking 11 can be received in the contact seat 18 such that the contact element 17 is positioned and held in the contact seat 18. The contact element 17 is inserted into the contact seat 18 in connecting direction S, and in the assembled state is locked into the contact seat 18, and is therefore secured against being pulled out in mating connector direction G.

The contact region 14 further comprises a contact module receptacle 32. The contact module receptacle 32 is delimited in connecting direction S by the base 36, which forms the connector face of the contact housing 13. Laterally, the contact module receptacle 32 is encompassed by the two side walls 33 of the contact housing 13. In mating connector direction G, the cable duct 37 of the contact housing 13 adjoins the contact module receptacle 32. The stranded cables 12 of the contact housing extend through the cable duct 37 when the contact module 22, 22' that is fitted with stranded cables 12 is held in the contact module receptacle 32.

Figure 8:
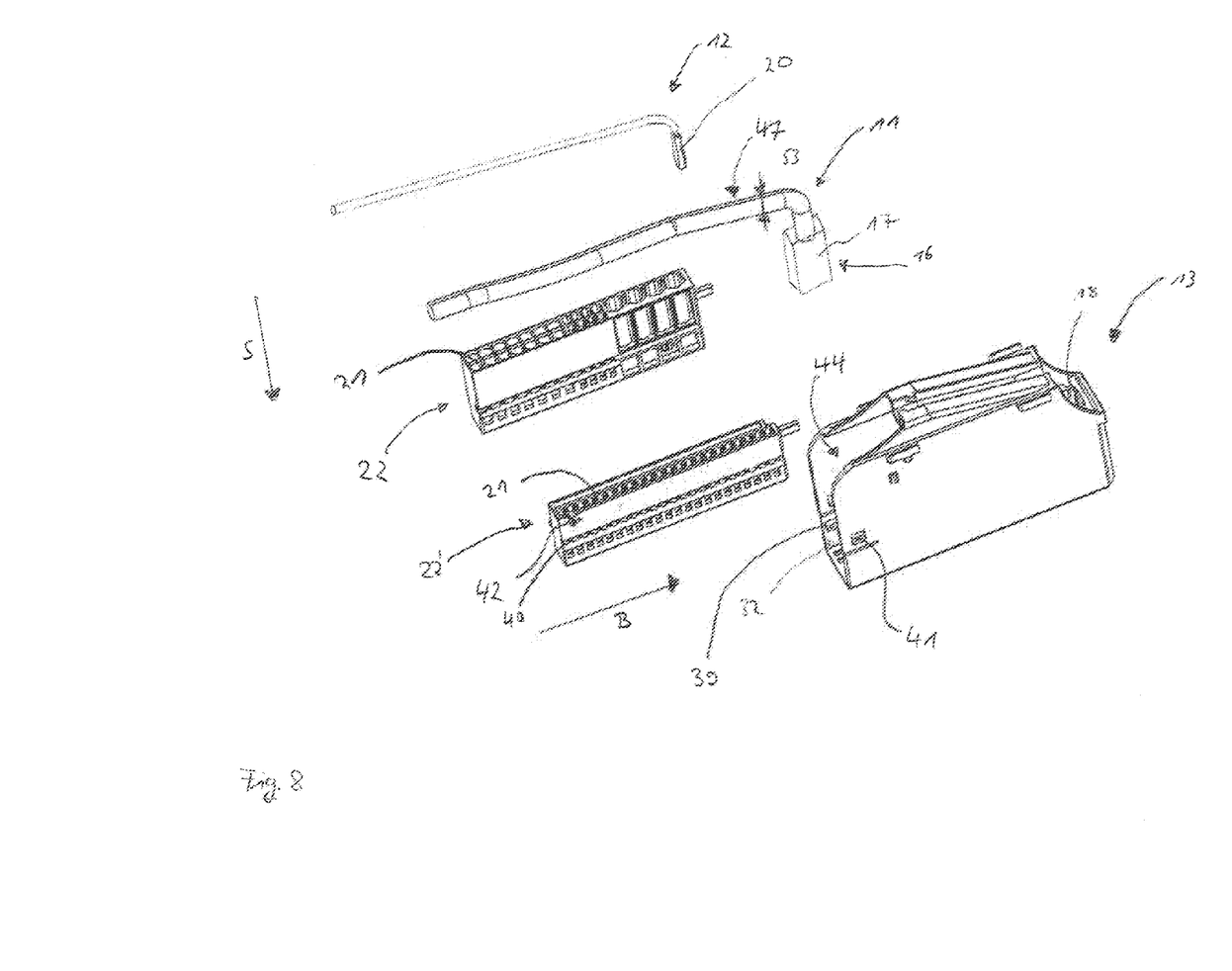
FIG. 8 a schematic, perspective, exploded view of the contact housing according to the invention, along with a cable that is prone to kinking, a stranded cable, and two contact modules.

Opposite direction of actuation B, the contact module receptacle 32 ends in the plug-in opening 38, so that the contact modules 22, 22' can be inserted in direction of actuation B through said plug-in opening 38 into the contact module receptacle 32 of the contact housing 13. To facilitate assembly of the contact modules 22, 22' and to ensure proper seating thereof in the contact module receptacle 32, the contact housing 13 is provided on the inner sides of its side walls 33 with guide tracks 39. The tracks 39 extend parallel to direction of actuation B and, together with corresponding guide grooves 40 on the outer sides of the contact modules 22, 22', form a linear guide, which facilitates insertion of the contact modules 22, 22' into the contact module receptacle 32 in direction of actuation B and ensures proper seating of the contact modules 22, 22' in the contact module receptacle 32. To prevent the contact modules 22, 22' from becoming unintentionally detached from the contact module receptacle 32, the side walls 33 of the contact housing 13 are provided with snap-in openings 41, which, together with corresponding snap-in noses 42 on the contact modules 22, 22', form a latch.

Figure 7:
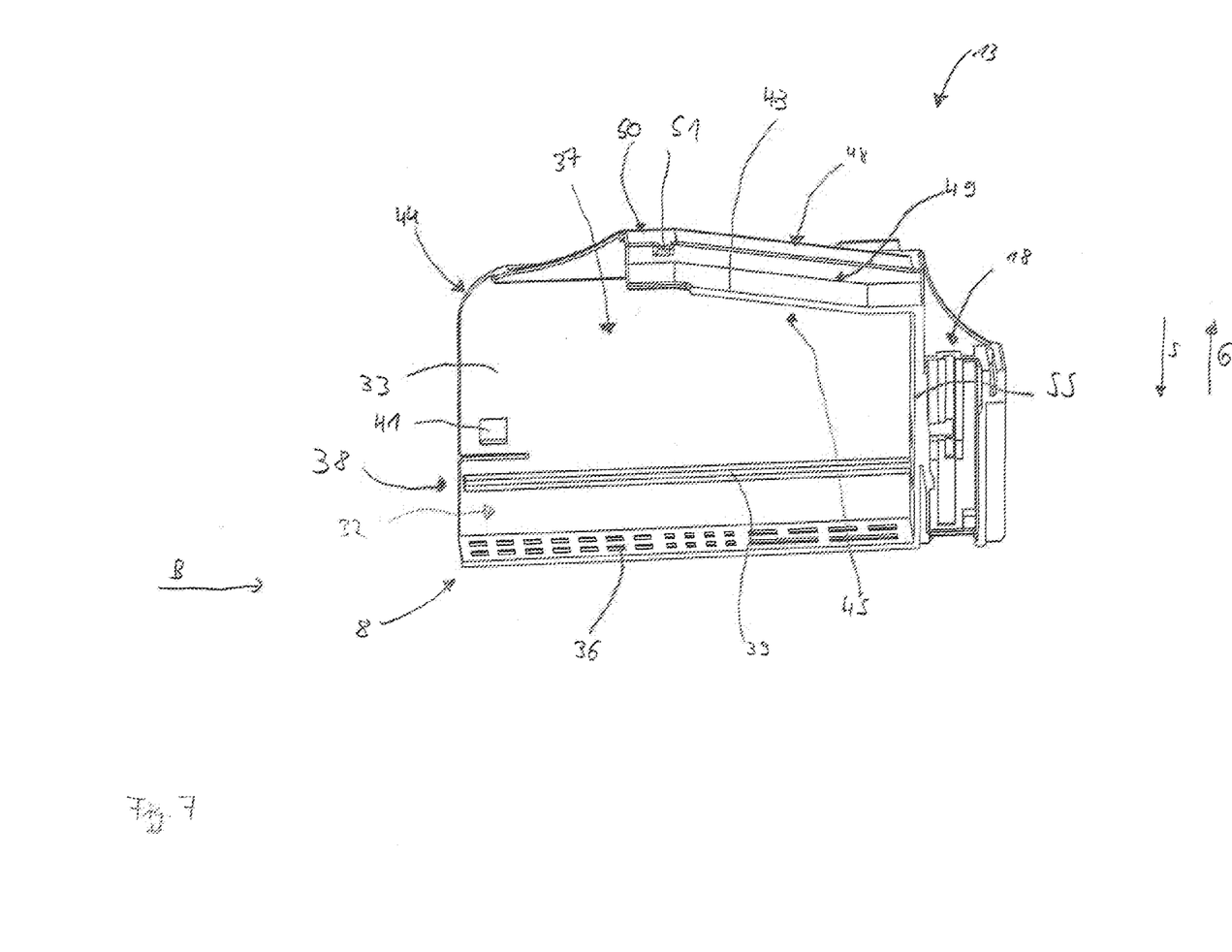
FIG. 7 a sectional illustration of the contact housing of FIG. 6 according to the invention.

The cable duct 37 of the contact housing 13, through which the stranded cables 12 extend, is sealed in connecting direction S by the contact modules 22, 22', laterally by the walls 33 of the contact housing 13, in direction of actuation B by a dividing wall 55 between cable duct 37 and contact seat 18, and in mating connector direction G by a cover 43. The cable duct therefore extends from the contact module receptacle 32 in the interior of the contact housing 13 up to a cable outlet region 44, so that the stranded cables 12 can be routed out of the contact housing 13 only through the cable outlet region 44. It is thereby ensured that the stranded cables 12 are not located at unintended positions, for example, on the outside next to the side walls 33, in which they would impede installation of the connector 13 or a joining of connector 2 with mating connector 3.

This can be the case, in particular, with the stranded cables 12, which are located further to the rear in the contact module receptacle 32 in direction of actuation B, near the dividing wall 55, since these stranded cables 12 have the longest path to travel in the assembled connector 2 to reach the cable inlet opening 15 in the outer housing.

The contact housing 13 in the embodiment illustrated therefore has a retaining device 45, which restricts the emergence of the stranded cables 12 from the contact housing 13 to the predefined cable outlet region 44. In generic contact housings, for example, the housing of DE 10 2010 013 446, the contact housing 13 is completely open in mating connector direction G, so that the stranded cables 12 can exit the contact housing 13 at any location in mating connector direction G. In the contact housing 13 according to the invention this is prevented by the retaining device 45. In the embodiment shown, the cover 43, which seals the contact housing 13 in mating connector direction G, forms the retaining device 45.

However, alternative embodiments are also conceivable, for example, a retaining device which connects the inner walls of the side walls 33 of the contact housing and on which the stranded cables 12 are diverted and forced downward in connecting direction S when the contact modules 22, 22' fitted with stranded cables 12 are inserted.

In addition to the special embodiment of the contact housing 13 with retaining device 45, the contact housing 13 has a positioning means 46 for fixing the position of a laced section 47. The positioning means 46 is located on the outside of the cover 43. In the embodiment shown, the positioning means 46 is integrated into the cover 43 and has a guide element 48, which aligns the position of the cable that is prone to kinking 11. The laced section 47, which is positioned in the guide element 48, extends such that the cable that is prone to kinking 11 points toward the cable inlet opening 15. When the connector 2 is in the assembled state, the kink-prone cable 11 is therefore inserted through the cable inlet opening 15 nearly without stress, and is fixed in position in the guide element 48 prior to assembly.

In the embodiment shown, the guide element 48 is formed as a conduit 49, which is adapted to the outer contours of the cable that is prone to kinking 11, so that the cable 11 can be inserted in a precise fit into the side conduit 49. The conduit 49 is a groove, which opens up in mating-connector direction G, so that the laced section 47 can be inserted into the conduit 49 in connecting direction S.

To secure the laced section 47 on the positioning means 46, in particular, in the guide element 48 thereof, the positioning means 46 is provided with a securing element 50. In the embodiment shown, the securing element 50 is formed by two retaining lands 51, which are located at the end of the conduit 49 that faces opposite fastening direction B, and at this point decrease the conduit width 52 to less than the outer diameter 53 of the laced section 47. The two retaining lands 51 are arranged offset from one another in direction of actuation B, so that the cable that is prone to kinking 11 can be threaded in at this point, and, once it has been properly positioned, is secured by the retaining lands 51 against removal from conduit 49 in mating connector direction G. Since the securing element 50 is located on the guide element 48, the kink-prone cable 11, which is in the desired alignment, is fixed in position on the positioning means 46.

Figure 9:
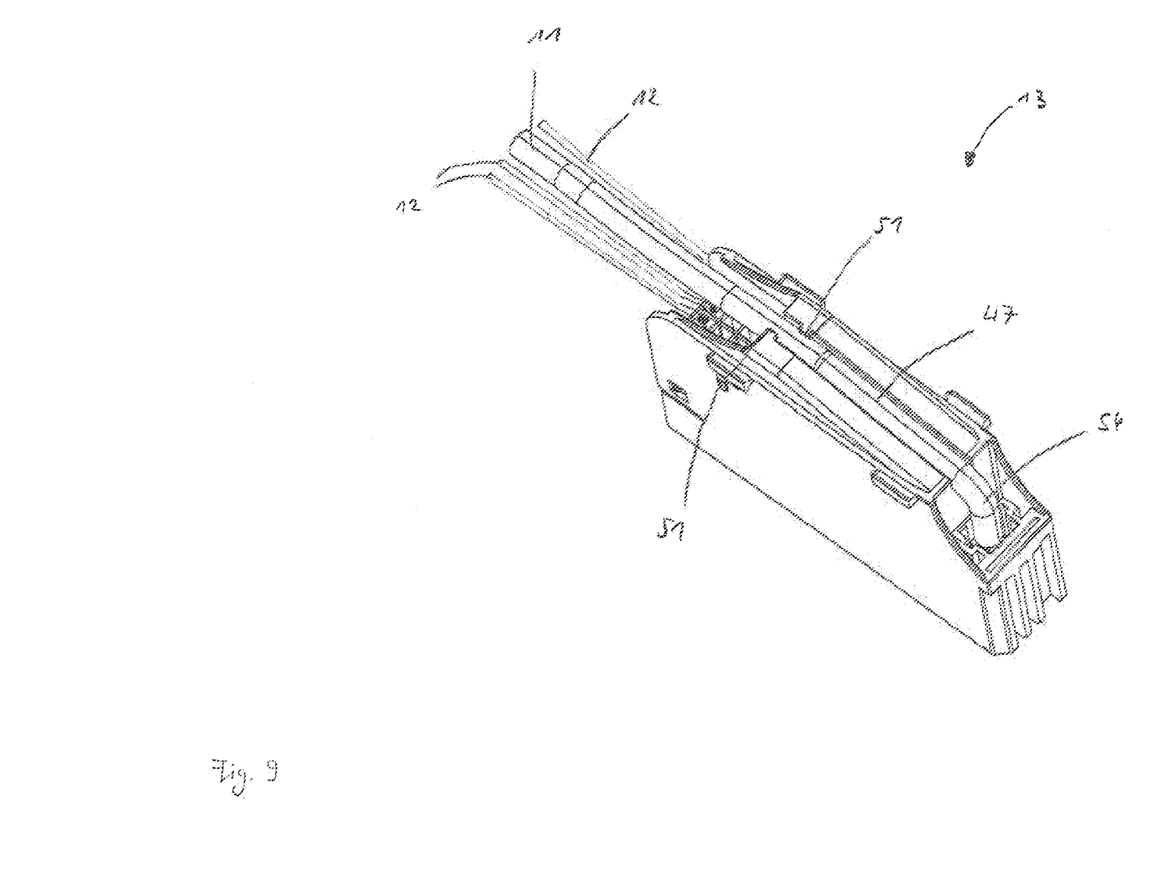
FIG. 9 the contact housing of FIG. 8 according to the invention in the assembled state, in the manner in which it is arranged in the outer housing.
Figure 10:
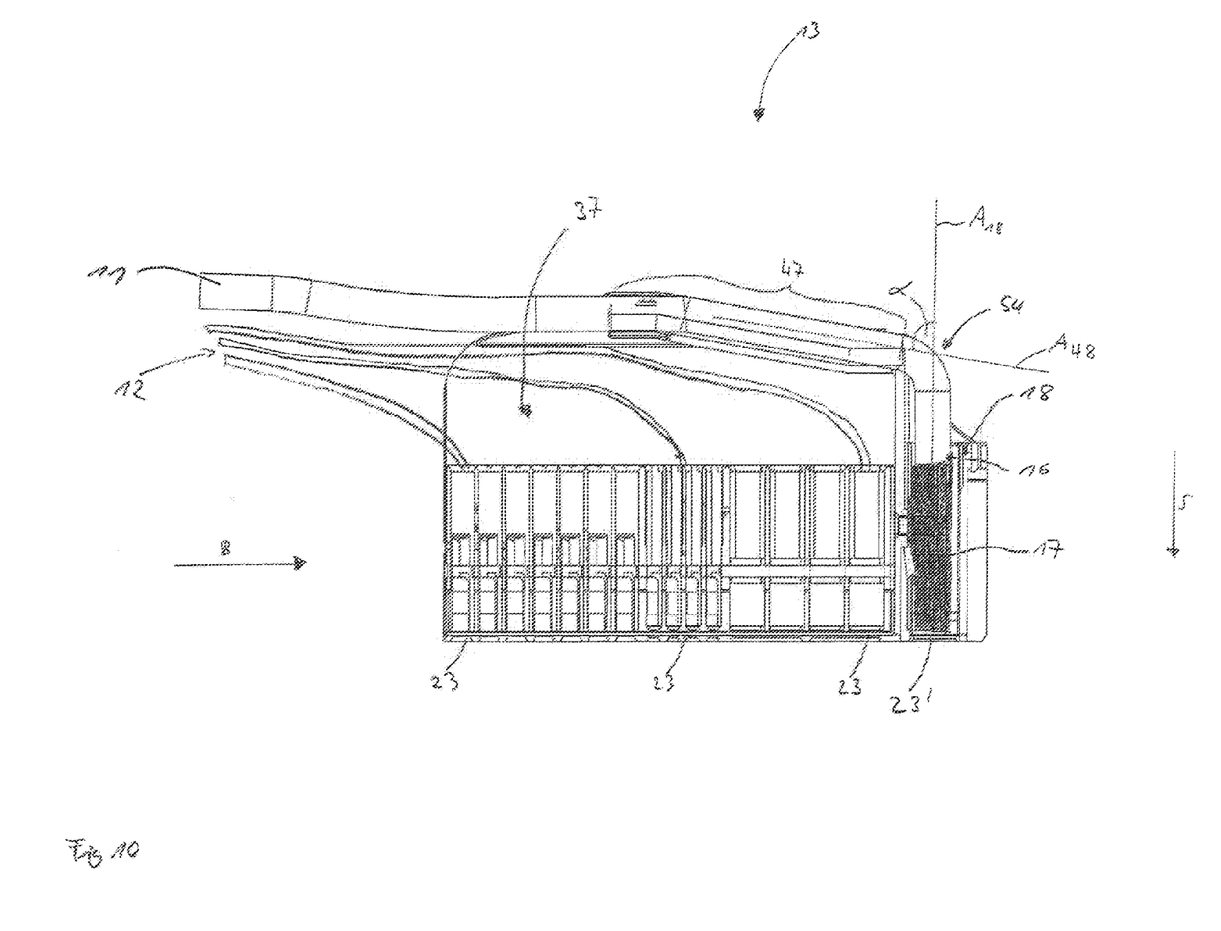
FIG. 10 a sectional illustration of the contact housing of FIG. 9 according to the invention, with stranded cables and cables that are prone to kinking.

The seat of the cable that is prone to kinking 11 according to the invention is shown in FIGS. 9 and 10 in its assembled state in the contact housing 13. In particular, it is clear from FIG. 10 that the unguided region 54 of the kink-prone cable 11, which extends between the contact-side end 16 of said cable and the laced section 47 thereof, is exposed and is therefore able to evenly and naturally distribute the stress in this region. In this connection, axis $A_{18}$ of the contact seat 18 and axis $A_{48}$ of the guide element define the bending angle α of the kink-prone cable 11 in the unguided region 54, and therefore ensure that the folding or bending angle α does not exceed a critical angle, at which cable breaks can occur. The desired bending radius can also be optimized in the unguided region 54 of the kink-prone cable 11 by means of the spatial arrangement of the guide element 48 in relation to the alignment of the contact seat 18, and can be applied to regions that are not critical to the kink-prone cable 11.

Therefore, the alignment of the cable 11 is predefined by the positioning means 46 for fixing the position of the laced section 47, and said cable is fastened onto the contact housing 13 in a manner that prevents damage to the cable 11. The assembly of the contact housing 13 that is fitted with all the cables 11, 12 with the outer housing 9 is thereby facilitated.

The contact housing 13 according to the invention can be produced particularly easily as an injection molded part, in which the contact housing 13 with the positioning means 46 and the retaining device 45 is formed as a single integral piece. In the embodiment of the contact housing 13 according to the invention, illustrated in the figures, the formation of the positioning means 46 on the retaining device 45, in other words, the design of conduit 49 with retaining lands 51 on the outside of the cover 43, enables a particularly compact construction.

Since the guide element 48 faces the cable inlet opening 15 of the outer housing 9, and since the cable outlet region 44 of the contact housing 13 leads to the area of the cable inlet opening 15 of the outer housing 9, the contact housing 13 according to the invention further ensures that the cables 11, 12 emerge from the contact housing 13 only at pre-defined regions, where they transition nearly directly into the cable inlet opening 15 of the outer housing 9. This improves the operational safety of the connector 2, since the cables 11, 12 can be positioned in the area of the mating-connector receptacle 25.

LIST OF REFERENCE SIGNS

1 Connector assembly
2 Connector
3 Mating connector
4 Hole
5 Wall
6 First side of the wall
7 Second side of the wall
8 Connecting section
9 Outer housing
10 Locking device
11 Kink-prone cable
12 Stranded cable
13 Contact housing
14 Contact region
15 Cable inlet opening
16 Contact-side end of the kink-prone cable
17 Contact element of the kink-prone cable
18 Contact seat
19 Interior space in the outer housing
20 Stranded contacts
21 Contact cavities
22, 22' Contact modules
23, 23' Contact openings of the connecting section
24 Mating-connector contact housing
25 Mating-connector receptacle
26 Fastening pin
27 Fastening element openings
28 Sliding element
29 Actuation section
30 Locking organ
31 Locking elements
32 Contact module receptacle
33 Side walls of the contact housing
34 Latching elements
35 Seal
36 Base of the contact housing
37 Cable duct
38 Plug-in opening
39 Guide tracks
40 Guide grooves
41 Snap-in opening
42 Snap-in nose
43 Cover
44 Cable outlet region
45 Retaining device
46 Positioning means
47 Laced section
48 Guide element 49 Conduit
50 Securing element
51 Retaining lands
52 Conduit width
53 Outer diameter of the kink-prone cable
54 Unguided region of the kink-prone cable
55 Dividing wall
S Connecting direction
G Mating connector direction
B Actuation direction
$A_{18}$ Axis of the contact seat
$A_{48}$ Axis of the guide element
α Bending angle

The invention claimed is:

1. A contact housing,
comprising: a contact seat, wherein the contact seat receives a contact end of a first cable that is prone to kinking;
a cover having a guide element along which the first cable extends;
a securing element abutting the first cable such that the first cable is in contact with the length of the guide element; and
a contact module receptacle housing a contact module fitted with at least one stranded second cable and connected with the cover such that the cover is in between the first cable and the at least one stranded second cable to restrict the emergence of the at least one stranded second cable from the contact housing.

2. The contact housing of claim 1, wherein the securing element is disposed on the guide element.

3. The contact housing of claim 2, wherein the securing element is disposed on part of the guide element, and a portion of the guide element that does not include the securing element is positioned between the contact seat and the securing element.

4. The contact housing of claim 1, wherein the contact seat and guide element are separated by a distance, and the position of the guide element determines the shape of the first cable in the region between the contact seat and guide element.

5. The contact housing of claim 1, wherein the cover seals sections of the contact housing.

6. The contact housing of claim 5, wherein the guide element and the securing element are integrated into the cover.

7. The contact housing of claim 1, further comprising a cable duct leading from the contact module receptacle to the cable outlet region.

8. The contact housing of claim 7, wherein the contact seat is located outside of the cable duct.

9. The contact housing of claim 1, wherein the contact seat, the guide element, the securing element, the contact module receptacle, and the cover are formed as an integral piece.

10. A connector, comprising:
an outer housing comprising a cable inlet opening, a contact housing, and a receptacle for a mating connector; wherein
the contact housing comprises:
a contact seat, wherein the contact seat receives a contact end of a first cable that is prone to kinking;
a cover having a guide element along which the first cable extends;
a securing element abutting the first cable such that the first cable is in contact with the length of the guide element; and
a contact module receptacle housing a contact module fitted with at least one stranded second cable and connected with the cover such that the cover is in between the first cable and the at least one stranded second cable to restrict the emergence of the at least one stranded second cable from the contact housing.

11. The connector of claim 10, wherein the guide element aligns the first cable with the cable inlet opening.

12. The connector of claim 11, wherein the aligns the stranded second cable with the cable inlet opening.

13. The connector of claim 10, wherein the securing element is disposed on the guide element.

14. The connector of claim 13, wherein the securing element is disposed on part of the guide element, and a portion of the guide element that does not include the securing element is positioned between the contact seat and the securing element.

15. The connector of claim 10, wherein the contact seat and guide element are separated by a distance, and the position of the guide element determines the shape of the first cable in the region between the contact seat and guide element.

16. The connector of claim 10, wherein the cover seals sections of the contact housing.

17. The connector of claim 16, wherein the guide element and the securing element are integrated into the cover.

18. The connector of claim 10, further comprising a cable duct leading from the contact module receptacle to the cable outlet region.

19. The connector of claim 18, wherein the contact seat is located outside of the cable duct.

20. The connector of claim 10, wherein the contact seat, the guide element, the securing element, the contact module receptacle, and the are formed as an integral piece.

21. A contact housing, comprising:
a contact seat, wherein the contact seat receives a contact end of a first cable that is prone to kinking;
a cover having a guide element along which the first cable extends;
a securing element abutting the first cable such that the first cable is in contact with the length of the guide element; and
a contact module receptacle housing a contact module fitted with at least one stranded second cable-and connected with the cover such that the cover restricts the emergence of the at least one stranded second cable from the contact housing and seals sections of the contact housing.

22. The contact housing of claim 21, wherein the guide element and the securing element are integrated into the cover.

23. A connector, comprising:
an outer housing comprising a cable inlet opening, a contact housing, and a receptacle for a mating connector; wherein
the contact housing comprises:
a contact seat, wherein the contact seat receives a contact end of a first cable that is prone to kinking;
a cover having a guide element along which the first cable extends;
a securing element abutting the first cable such that the first cable is in contact with the length of the guide element; and
a contact module receptacle housing a contact module fitted with at least one stranded second cable and connected with the cover such that the cover restricts the emergence of the at least one stranded second cable from the contact housing and seals sections of the contact housing.

24. The connector of claim 23, wherein the guide element and the securing element are integrated into the cover.

25. A contact housing, comprising:
a contact seat, wherein the contact seat receives a contact end of a first cable that is prone to kinking;
a guide element along which the first cable extends;
a securing element abutting the first cable such that the first cable is in contact with the length of the guide element;
a contact module receptacle housing a contact module fitted with at least one stranded second cable;
a retaining device positioned on the contact module receptacle and restricting the emergence of the at least one stranded second cable from the contact housing; and
a cable duct leading from the contact module receptacle to the cable outlet region;
wherein the contact seat is located outside of the cable duct.

26. A connector, comprising:
an outer housing comprising a cable inlet opening, a contact housing, and a receptacle for a mating connector; wherein
the contact housing comprises:
a contact seat, wherein the contact seat receives a contact end of a first cable that is prone to kinking;
a guide element along which the first cable extends;
a securing element abutting the first cable such that the first cable is in contact with the length of the guide element;
a contact module receptacle housing a contact module fitted with at least one stranded second cable;
a retaining device positioned on the contact module receptacle and restricting the emergence of the at least one stranded second cable from the contact housing; and
a cable duct leading from the contact module receptacle to the cable outlet region;
wherein the contact seat is located outside of the cable duct.

* * * * *